(12) United States Patent
Anna et al.

(10) Patent No.: US 10,664,367 B2
(45) Date of Patent: May 26, 2020

(54) SHARED STORAGE PARITY ON RAID

(71) Applicant: International Business Machines Corporation, Armonk, NY (US)

(72) Inventors: Gary Anna, Tucson, AZ (US); Emmanuel Barajas Gonzalez, Guadalajara (MX); Shaun E. Harrington, Sahuarita, AZ (US); Harry R. McGregor, Tucson, AZ (US); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/827,926

(22) Filed: Nov. 30, 2017

(65) Prior Publication Data

US 2019/0163587 A1 May 30, 2019

(51) Int. Cl.
| | | |
|---|---|---|
| *G06F 11/00* | (2006.01) | |
| *G06F 11/20* | (2006.01) | |
| *G06F 3/06* | (2006.01) | |
| *G06F 11/10* | (2006.01) | |
| *G06F 11/30* | (2006.01) | |

(52) U.S. Cl.
CPC ........ *G06F 11/2056* (2013.01); *G06F 3/0689* (2013.01); *G06F 11/1092* (2013.01); *G06F 11/3034* (2013.01)

(58) Field of Classification Search
CPC . G06F 11/2056; G06F 11/1092; G06F 3/0689
USPC ...................................................... 714/6.23
See application file for complete search history.

(56) References Cited

U.S. PATENT DOCUMENTS

| | | |
|---|---|---|
| 5,666,512 A | 9/1997 | Nelson et al. |
| 6,298,415 B1 | 10/2001 | Riedle |
| 6,976,187 B2 | 12/2005 | Arnott et al. |
| 8,099,623 B1 | 1/2012 | Li et al. |

(Continued)

OTHER PUBLICATIONS

Anonymous, "System and method to improve rebuild performance of distributed RAID," IP.com, No. IPCOM000248791D, Jan. 12, 2017, pp. 1-7.

(Continued)

*Primary Examiner* — Yair Leibovich
(74) *Attorney, Agent, or Firm* — Zilka-Kotab, P.C.

(57) ABSTRACT

A computer-implemented method, according to one embodiment, includes: determining that a data storage drive in a first array has failed, determining a location to rebuild the failed data storage drive, instructing performance of a rebuild operation at the determined location, determining one or more data storage drives in one or more arrays having a combined amount of available space that is sufficient to mirror data and/or parity information of the first array, instructing mirroring of the data and/or parity information of the first array in parallel with performing the rebuild operation, instructing deletion of the mirrored data and/or parity information of the first array from the one or more data storage drives in response to the rebuild operation being completed, and instructing reallocation of the space in the one or more data storage drives used to mirror the data and/or parity information of the first array as available space.

20 Claims, 9 Drawing Sheets

(56) References Cited

U.S. PATENT DOCUMENTS

| | | | |
|---|---|---|---|
| 8,543,761 B2 | 9/2013 | Goldick | |
| 8,977,893 B2 | 3/2015 | Samanta et al. | |
| 9,389,958 B2 | 7/2016 | Sundaram et al. | |
| 10,013,321 B1* | 7/2018 | Stern | G06F 11/2069 |
| 2002/0156987 A1* | 10/2002 | Gajjar | G06F 3/0605 |
| | | | 711/203 |
| 2004/0015656 A1* | 1/2004 | Rust | G06F 3/0617 |
| | | | 711/114 |
| 2007/0088990 A1 | 4/2007 | Schmitz | |
| 2010/0077160 A1* | 3/2010 | Liu | G06F 3/0482 |
| | | | 711/162 |
| 2014/0215262 A1* | 7/2014 | Li | G06F 11/0727 |
| | | | 714/6.21 |
| 2018/0165169 A1* | 6/2018 | Camp | G06F 11/2069 |

OTHER PUBLICATIONS

Anonymous, "System and method to accelerate array rebuilding with storage virtualization," IP.com, No. IPCOM000242650D, Jul. 31, 2015, pp. 1-9.

\* cited by examiner

SHARED STORAGE PARITY ON RAID

BACKGROUND

The present invention relates to data storage systems, and more specifically, this invention relates to maintaining performance in data storage drives of a data storage system.

Redundant array of independent disks (RAID) is a data storage approach that combines multiple storage drives into a single logical unit for increasing performance and/or data reliability. RAID technology functions by placing data on multiple disks and allowing input/output (I/O) operations to overlap in a balanced way, thereby improving performance. Disk striping is the process of dividing a body of data into blocks and spreading the data blocks across the multiple disks. A stripe is made up of the data divided across the multiple disks, and a striped unit (or strip) which refers to the data slice on an individual drive. Because the use of multiple disks increases the mean time between failures, storing data redundantly also increases fault tolerance. Thus, while not all RAID levels (e.g., formats) provide redundancy, RAID technology offers a way to store the same data in different places on multiple hard disks to protect the data in the event of a drive failure.

While RAID levels (e.g., RAID, 5, 6, etc.) as well as individual storage units themselves (spinning disk, solid state drives, flash, etc.) have been improved over time, the overall RAID architecture intent has remained the same in conventional products. Specifically, in order to achieve some data redundancy within RAID technology, conventional products have striped data across drives and then copied back the striped data to a new drive in the event of a storage failure. As long as these conventional products are able to complete such copy processes following a failure without any additional errors occurring, no issues arise. However, in the event that a copy process has not been completed before another storage failure occurs, the chances of experiencing a system crash increase significantly.

Moreover, while performing a copy process following a storage failure event in a conventional product, the speed at which the copy process may be performed is predominantly determined by the pace at which the new drive can write the data received. As a result, the exposure that conventional products have to experiencing system crashes and resulting data loss occurs during the time spent completing the writing during a copy process.

SUMMARY

A computer-implemented method, according to one embodiment, includes: determining that a data storage drive in a first array has failed, determining a location to rebuild the failed data storage drive, instructing performance of a rebuild operation at the determined location, determining one or more data storage drives in one or more arrays having a combined amount of available space that is sufficient to mirror data and/or parity information of the first array, instructing mirroring of the data and/or parity information of the first array in parallel with performing the rebuild operation, instructing deletion of the mirrored data and/or parity information of the first array from the one or more data storage drives in the one or more arrays in response to the rebuild operation being completed, and instructing reallocation of the space in the one or more data storage drives in the one or more arrays used to mirror the data and/or parity information of the first array as available space.

A computer program product, according to another embodiment, includes a computer readable storage medium having program instructions embodied therewith. The computer readable storage medium is not a transitory signal per se. Moreover, the program instructions readable by a processor, executable by the processor, or readable and executable by the processor to cause the processor to perform a method which includes: determining, by the processor, that a data storage drive in a first array has failed; determining, by the processor, a location to rebuild the failed data storage drive; instructing, by the processor, performance of a rebuild operation at the determined location; determining, by the processor, one or more data storage drives in one or more arrays having a combined amount of available space that is sufficient to mirror data and/or parity information of the first array; instructing, by the processor, mirroring of the data and/or parity information of the first array in parallel with performing the rebuild operation; instructing, by the processor, deletion of the mirrored data and/or parity information of the first array from the one or more data storage drives in the one or more arrays in response to the rebuild operation being completed; and instructing, by the processor, reallocation of the space in the one or more data storage drives in the one or more arrays used to mirror the data and/or parity information of the first array as available space.

A system, according to yet another embodiment, includes: a processor; and logic integrated with the processor, executable by the processor, or integrated with and executable by the processor, the logic being configured to: determine, by the processor, that a data storage drive in a first array has failed; determine, by the processor, a location to rebuild the failed data storage drive; instruct, by the processor, performance of a rebuild operation at the determined location; determine, by the processor, one or more data storage drives in one or more arrays having a combined amount of available space that is sufficient to mirror data and/or parity information of the first array; instruct, by the processor, mirroring of the data and/or parity information of the first array in parallel with performing the rebuild operation; instruct, by the processor, deletion of the mirrored data and/or parity information of the first array from the one or more data storage drives in the one or more arrays in response to the rebuild operation being completed; and instruct, by the processor, reallocation of the space in the one or more data storage drives in the one or more arrays used to mirror the data and/or parity information of the first array as available space.

Other aspects and embodiments of the present invention will become apparent from the following detailed description, which, when taken in conjunction with the drawings, illustrate by way of example the principles of the invention.

DETAILED DESCRIPTION

Figure 1:
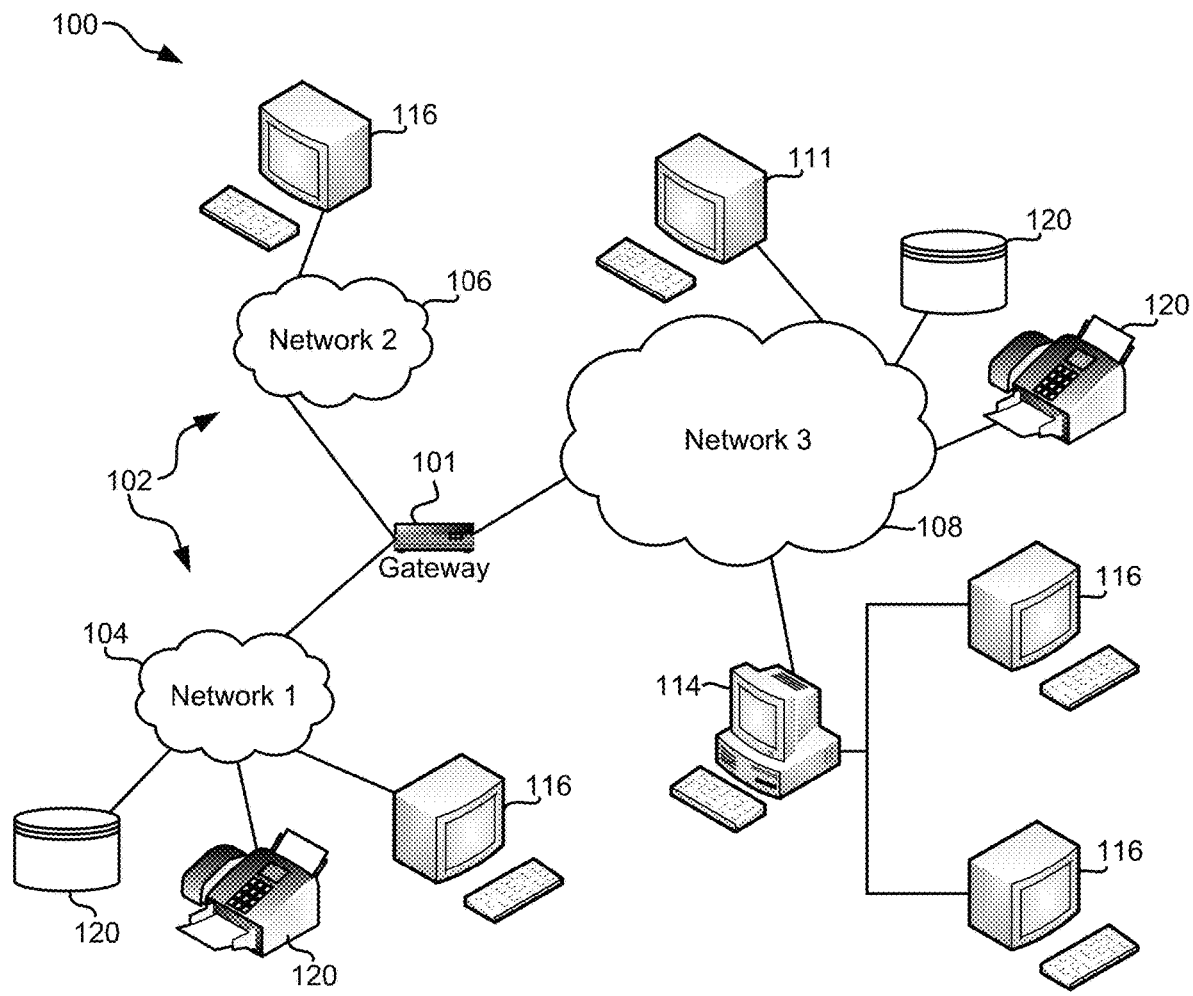
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for achieving significant improvements in the management of data storage arrays implementing RAID technology. While conventional products fail to provide any safeguards against the risk of experiencing a system crash and/or data loss following a storage failure, various ones of the embodiments described herein are able to reduce disk degradation, data loss, system downtime, etc., e.g., as will be described in further detail below.

In one general embodiment, a computer-implemented method includes: determining that a data storage drive in a first array has failed, determining a location to rebuild the failed data storage drive, instructing performance of a rebuild operation at the determined location, determining one or more data storage drives in one or more arrays having a combined amount of available space that is sufficient to mirror data and/or parity information of the first array, instructing mirroring of the data and/or parity information of the first array in parallel with performing the rebuild operation, instructing deletion of the mirrored data and/or parity information of the first array from the one or more data storage drives in the one or more arrays in response to the rebuild operation being completed, and instructing reallocation of the space in the one or more data storage drives in the one or more arrays used to mirror the data and/or parity information of the first array as available space.

In another general embodiment, a computer program product includes a computer readable storage medium having program instructions embodied therewith. The computer readable storage medium is not a transitory signal per se. Moreover, the program instructions readable by a processor, executable by the processor, or readable and executable by the processor to cause the processor to perform a method which includes: determining, by the processor, that a data storage drive in a first array has failed; determining, by the processor, a location to rebuild the failed data storage drive; instructing, by the processor, performance of a rebuild operation at the determined location; determining, by the processor, one or more data storage drives in one or more arrays having a combined amount of available space that is sufficient to mirror data and/or parity information of the first array; instructing, by the processor, mirroring of the data and/or parity information of the first array in parallel with performing the rebuild operation; instructing, by the processor, deletion of the mirrored data and/or parity information of the first array from the one or more data storage drives in the one or more arrays in response to the rebuild operation being completed; and instructing, by the processor, reallocation of the space in the one or more data storage drives in the one or more arrays used to mirror the data and/or parity information of the first array as available space.

In another general embodiment, a system includes: a processor; and logic integrated with the processor, executable by the processor, or integrated with and executable by the processor, the logic being configured to: determine, by the processor, that a data storage drive in a first array has failed; determine, by the processor, a location to rebuild the failed data storage drive; instruct, by the processor, performance of a rebuild operation at the determined location; determine, by the processor, one or more data storage drives in one or more arrays having a combined amount of available space that is sufficient to mirror data and/or parity information of the first array; instruct, by the processor, mirroring of the data and/or parity information of the first array in parallel with performing the rebuild operation; instruct, by the processor, deletion of the mirrored data and/or parity information of the first array from the one or more data storage drives in the one or more arrays in response to the rebuild operation being completed; and instruct, by the processor, reallocation of the space in the one or more data storage drives in the one or more arrays used to mirror the data and/or parity information of the first array as available space.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
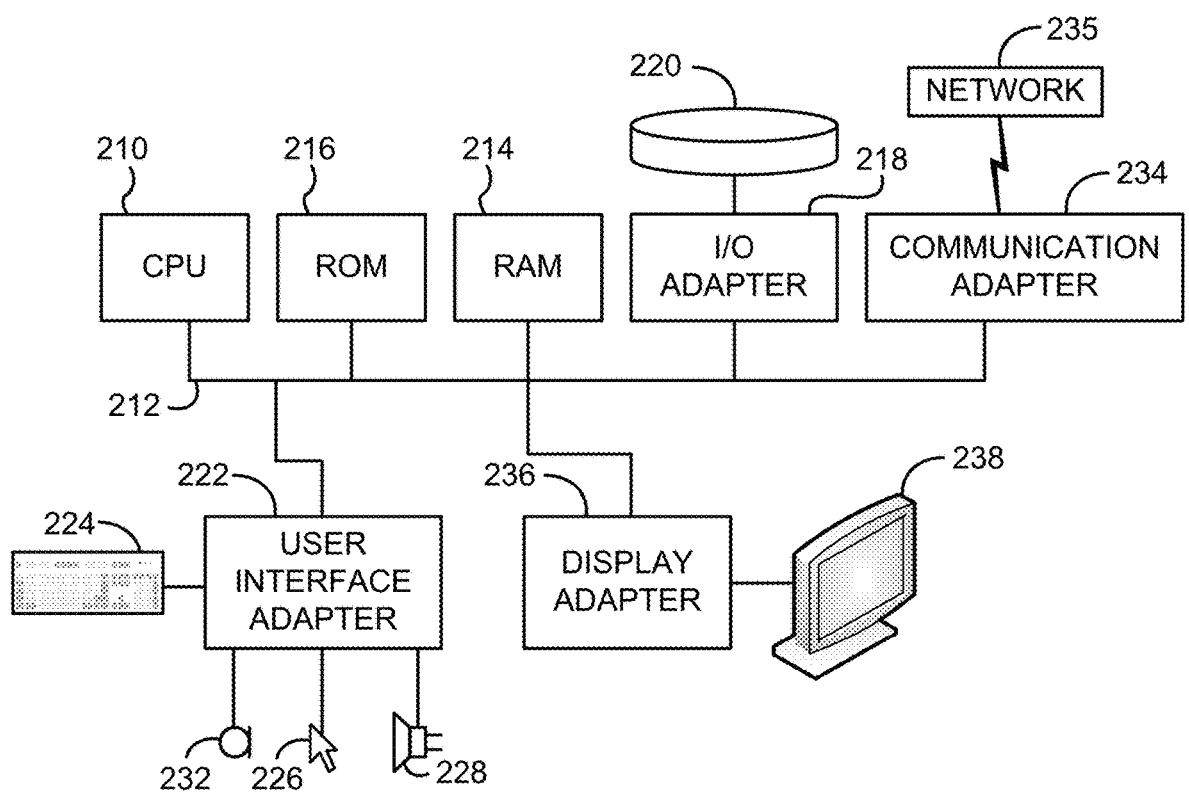
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
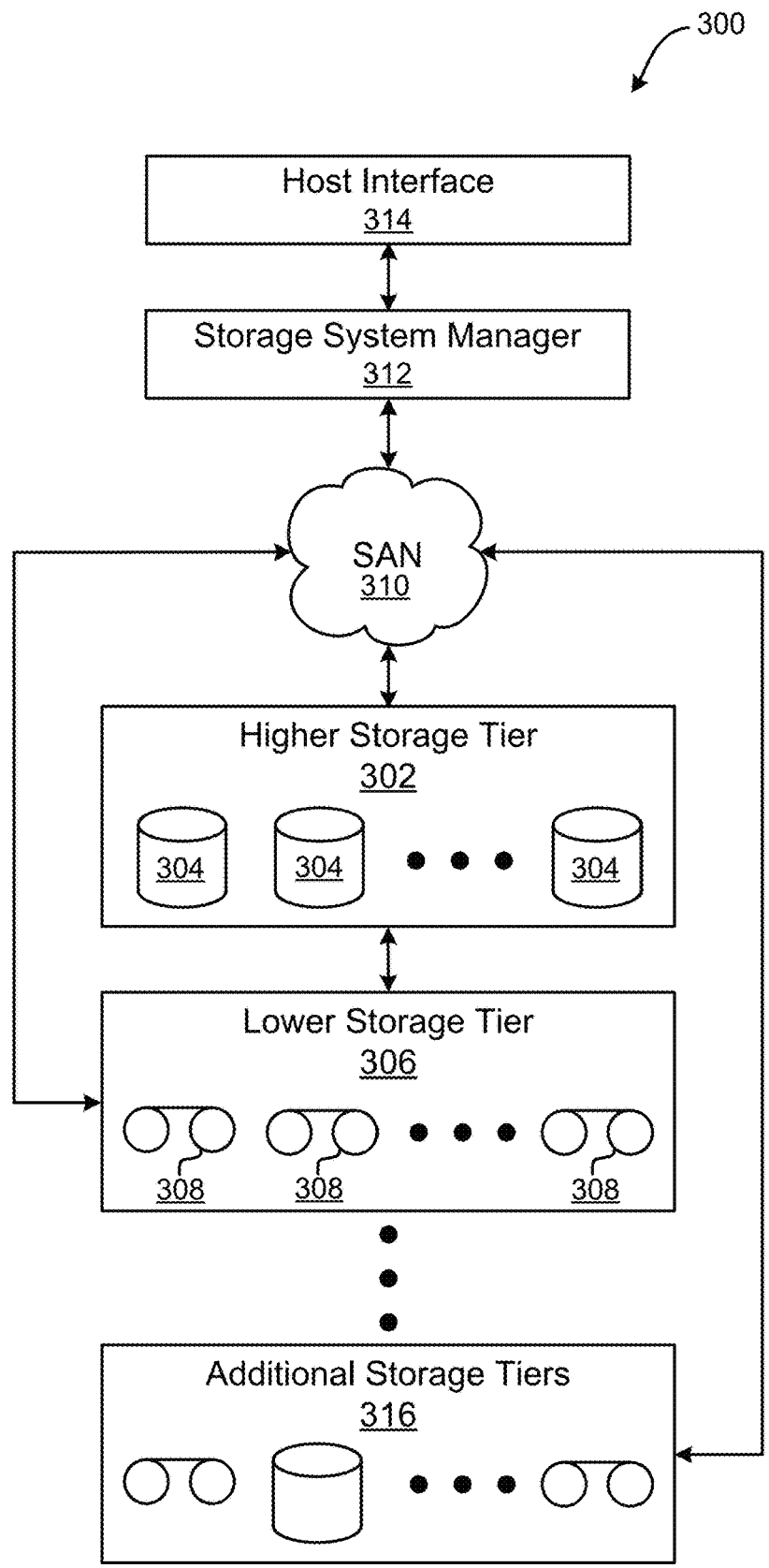
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, while RAID levels (e.g., RAID, 5, 6, etc.) as well as individual storage units themselves (spinning disk, SSD, flash, etc.) have been improved over time, the overall RAID architecture intent has remained the same in conventional products. Specifically, as long as these conventional products are able to complete such copy processes following a failure without any additional errors occurring, no issues arise. However, in the event that a copy process has not been completed before another storage failure occurs, the chances of experiencing a system crash increase significantly.

Moreover, while performing a copy process following a storage failure event in a conventional product, the speed at which the copy process may be performed is predominantly determined by the pace at which the new drive can write the data received. As a result, the exposure that conventional products have to experiencing system crashes and resulting data loss occurs during the time spent completing the writing during a copy process.

While conventional products fail to provide any safeguards against the risk of experiencing a system crash and/or data loss following a storage failure, various ones of the embodiments described herein are able to reduce disk degradation, data loss, system downtime, etc. after experiencing an initial drive failure, as will be described in further detail below.

Figure 4:
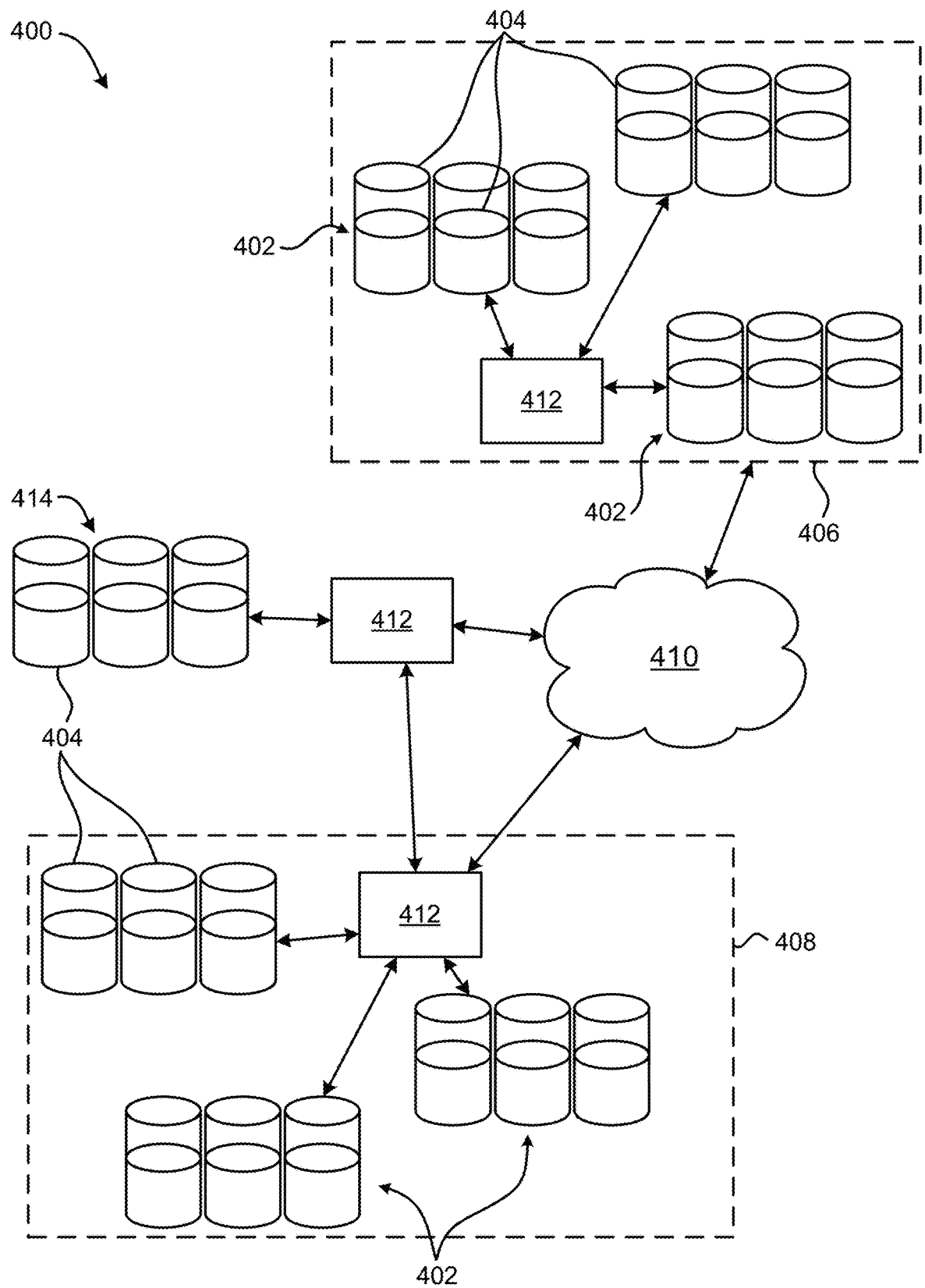
FIG. 4 is a partial representative view of a data storage system in accordance with one embodiment.

Looking to FIG. 4, a data storage system 400 is illustrated in accordance with one embodiment. As an option, the present data storage system 400 may be implemented in conjunction with features from any other embodiment listed herein, such as those described with reference to the other FIGS. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

As shown, the data storage system 400 includes a plurality of storage arrays 402, each of which include a plurality of storage drives 404. Although each of the storage arrays 402 are depicted in the present embodiment as including the same number of storage drives 404, it should be noted that the storage arrays 402 may include any desired number of storage drives. Moreover, according to an exemplary approach which is in no way intended to limit the invention, each of the storage drives 404 may include HDDs. However, in other approaches any one or more of the storage drives 404 may include any desired type of storage medium (memory).

Multiple storage arrays 402 may be grouped together at a particular location. For instance, multiple storage arrays 402 may be grouped together to form a storage database 406 which may be located at a given geographical location, while other storage arrays 402 may be grouped together to form a system backup 408 which may be located at a different geographical location. However, in some approaches an array 414 may not be grouped with any other arrays.

Moreover, storage arrays 402 located at different locations may be connected via a network 410, e.g., such that data may be transferred between any of the storage arrays 402 depending on the desired approach. More specifically, each of storage arrays 402 may be coupled to a controller 412 (e.g., data manager) which in turn is connected to the network 410. Accordingly, data may be sent from and/or received at a given storage array 402 using a controller 412 which may be connected to the network 410 via a wireless connection, e.g., facilitated by an antenna included in the controller (not shown); a wired connection, e.g., facilitated by a cable, wire, logical bus, etc.; etc. Depending on the location of the storage arrays and/or configuration of various components in the data storage system 400, at least some of the controllers of the storage arrays 402 may be coupled to each other directly, e.g., as shown. Furthermore, a user may be able to access any one or more of the storage drives 404 in the data storage system using a computing device (e.g., a personal computer, mobile phone, terminal, etc.) which is electrically coupled to the network 410.

At least some of the storage arrays 402 included in a given data storage system 400 may implement RAID technology. For example, which is in no way intended to limit the invention, various ones of the storage drives 404 may store data according to a RAID 5 format. Thus, in addition to storing actual data, various storage drives 404 may additionally store parity information which may be used to restore the corresponding storage array 402 in the event of a storage failure.

Figure 5:
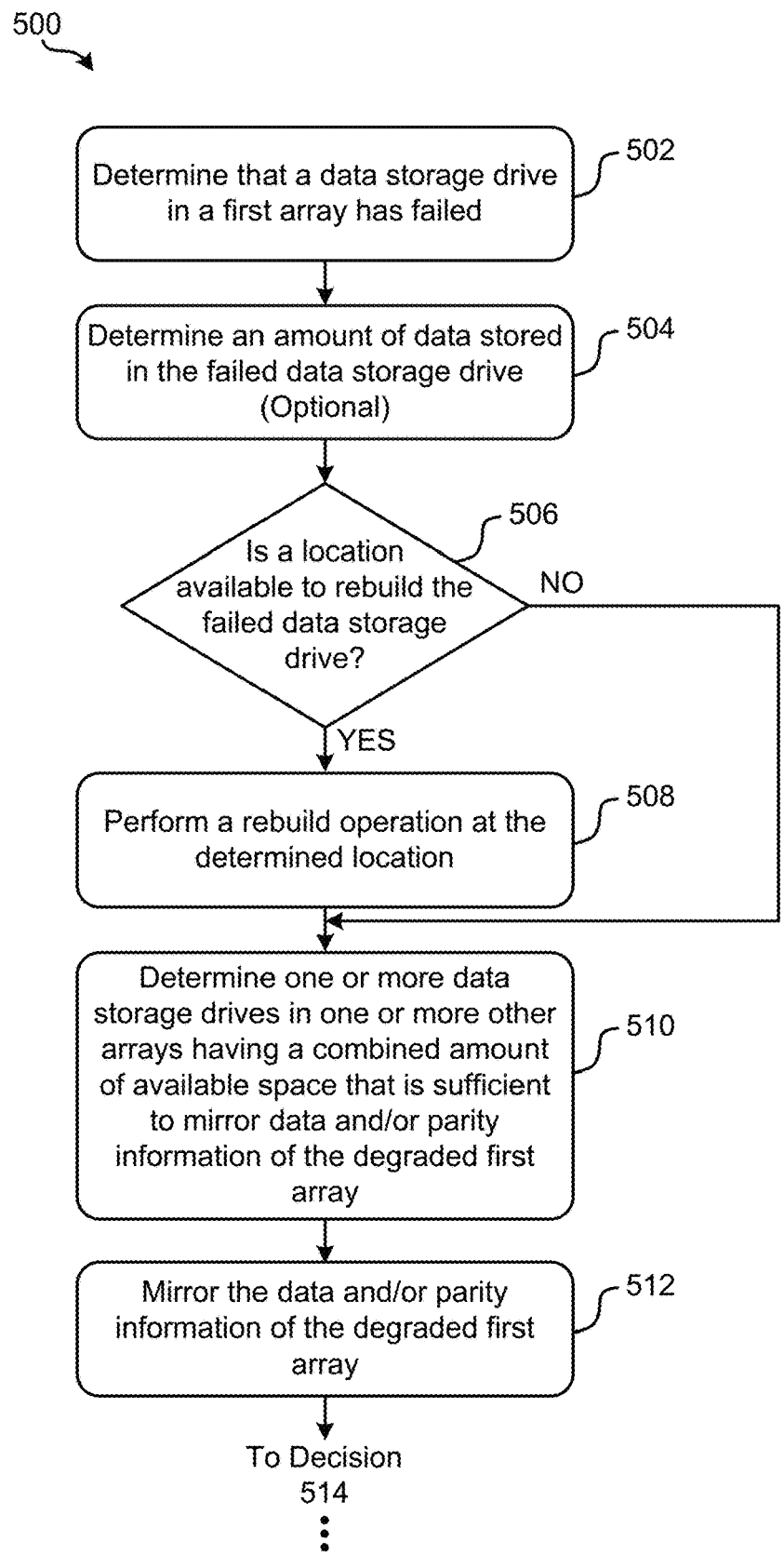
FIG. 5 is a flowchart of a method in accordance with one embodiment.
Figure 5:
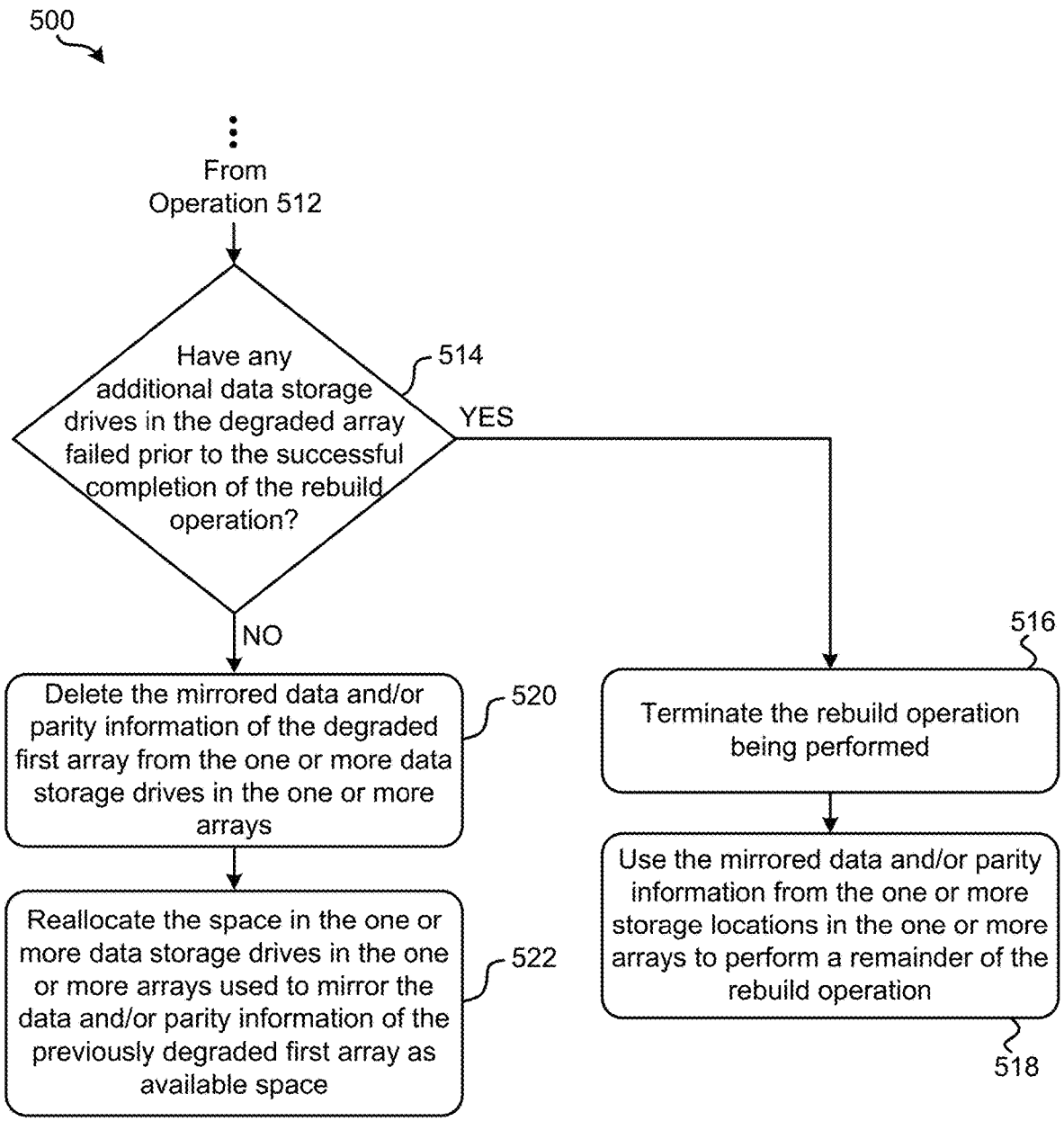

Now referring to FIG. 5, a flowchart of a computer-implemented method 500 for restoring a given storage array in the event of a storage drive failure is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Moreover, it should also be noted that any one or more of the processes included in method 500 may be performed in response to receiving an instruction (e.g., order, request, etc.) to do so. For instance, in some approaches, one or more instructions may be received by a controller performing the various processes included in method 500 from an overarching system controller which is coupled to the various data storage arrays included in the system. In other approaches, one or more instructions may be received from a controller in another one of the arrays in the system (e.g., see controllers 412 in FIG. 4).

As shown in FIG. 5, operation 502 of method 500 includes determining that a data storage drive in a first array has failed. Depending on the approach, determining that a data storage drive has failed may be accomplished in a number of different ways and may depend on where the drive failure occurred. For instance, in some approaches it may be determined that a given data storage drive has failed in response to receiving an error message from the given drive itself and/or a controller coupled thereto, in response to detecting the absence of a status report from the given storage drive, in response to detecting a failed connection to the given storage drive, etc.

Moreover, after determining that a storage drive has failed, optional operation 504 includes determining an amount of data stored in the failed data storage drive. According to some approaches, an amount of data stored in a failed data storage drive may be determined by referencing a table which tracks how much data is stored in one or more of the storage drives at a given point in time. In other approaches, optional operation 504 may be performed by querying the failed storage drive (if possible) in order to ascertain how much available space is included therein, which may further be used to calculate how much data is stored therein.

Furthermore, decision 506 includes determining whether a location is available to rebuild the failed data storage drive. In other words, decision 506 includes determining a location to rebuild the failed data storage drive. Depending on the approach, a failed data storage drive may be rendered unusable in terms of providing any functionality to the storage array in which it may be located. Accordingly, a failed data storage drive may desirably be replaced. However, before a failed data storage drive can be replaced, the data stored in the failed data storage drive may be rebuilt at a different storage location.

According to preferred approaches, the data stored in the failed drive is rebuilt in another data storage drive in a same array as the failed drive. As a result, the transfer of data to rebuild the failed drive may remain local, thereby decreasing system throughput, time delays, etc. In an exemplary approach, which is in no way intended to limit the invention, each data storage array may have a data storage drive that is allocated (e.g., designated) as a spare data storage drive for that array. In other words, each data storage array may have a spare storage drive included therein that is not used to store any data during normal operation of the array. However, upon experiencing a failure of at least one of the drives in the array, the spare storage drive may be used to repair the failed drive(s). Thus, the location determined to perform the rebuild of the failed data storage drive may be a data storage drive allocated as a spare data storage drive in the same array as the failed data storage drive (e.g., the degraded array).

In other approaches the array that experienced the drive failure may not have a spare data storage drive allocated therein. In such approaches, decision 506 may determine a location in a different array to perform the rebuild of the failed drive. It may be preferred that the determined location is in an array at a same location as the degraded array. For example, referring back momentarily to FIG. 4, upon experiencing a drive 404 failure in an array 402 at the storage database 406 that does not have a spare drive included therein, decision 506 may include determining to rebuild the failed drive in a spare drive of another one of the arrays 402 in the storage database 406. It follows that determining an amount of data that is stored in the failed data storage drive may be desirable in order to determine an appropriate location to rebuild the failed data storage drive.

Referring again to FIG. 5, method 500 proceeds to operation 508 in response to determining that a location is available to rebuild the failed data storage drive. There, operation 508 includes performing a rebuild operation at the location determined by decision 506. While the failed data storage drive may cause the data stored therein to be unusable or inaccessible, as mentioned above, each of the drives preferably implements RAID technology. Accordingly, parity information corresponding to the data stored in the storage drives of a given array may also be stored in the storage drives. Parity information may be formed using parity computations which calculate the data in two storage drives and store the results of such calculations in a third storage drive. In an exemplary approach, which is in no way intended to limit the invention, the parity information may be calculated (e.g., computed) by XOR'ing a bit from drive 1 with a bit from drive 2 and storing the result of the XOR in drive 3. However, depending on the particular RAID level implemented in a given storage array, the parity information may be stored in the storage drives differently, e.g., as would be appreciated by one skilled in the art after reading the present description. It follows that the parity information stored in the degraded array (the storage array having the storage drive determined to have failed in operation 502 above) may be used to rebuild the failed storage drive using any rebuild processes which would be apparent to ones skilled in the art after reading the present description. For instance, the parity information may be used in combination with a data reconstitution algorithm in order to rebuild the degraded array.

Once the rebuild operation has been completed, the degraded array may return to normal operation as it is no longer in an exposed state. However, before the rebuild operation has successfully been completed, the degraded array is vulnerable to further damage. Should additional storage drives fail in the degraded array, the degraded array and/or the storage system as a whole may experience data loss, halt events, etc. Again, the rate at which the writing is performed during the rebuild operation effectively serves as a bottleneck in completing the restoration of the degraded array. Thus, in order to reduce the risk of any further damage to the degraded array and/or the storage system as a whole, method 500 additionally includes determining one or more data storage drives in one or more other arrays having a combined amount of available space that is sufficient to mirror data and/or parity information of the degraded first array. See operation 510. In other words, operation 510 includes locating other storage arrays that have a combined amount of available (e.g., unused) storage space that is sufficient to store the data and/or parity information stored in the degraded first array.

According to preferred approaches, only the blocks of the degraded array involved with ensuring data integrity in the event of an additional drive failure on the rebuilding array are mirrored (e.g., copied). Thus, the mirroring process is effectively creating a RAID 10 data storage array on the fly in order to protect the degraded first array. Depending on the approach, the data, the parity information, or both may desirably be mirrored to other data storage drives. For instance, in some approaches the parity information may be specific to the actual data, in which case mirroring only the parity information may not be sufficient. However, in other approaches only the data may be desired, thereby obviating the benefit of also mirroring the parity information. However, in still other approaches, the data and parity information may be mutually exclusive, thereby increasing the desirability of mirroring both the data and the parity information, e.g., at least temporarily until a corresponding portion of the data is rebuilt in the spare drive.

In some approaches the data and/or parity information stored in the degraded first array may be copied (e.g., mirrored) to another single array which has a sufficient amount of available space therein to store the data and/or parity information. However, it is preferred that the data and/or parity information from the degraded array is copied across multiple other arrays in order to limit degradation of throughput and performance of the one or more arrays used to store the data and/or parity information. In some approaches the data and/or parity information in the degraded array may be split into a plurality of portions (e.g., blocks), each of the portions having the same or about the same size, such that each portion may be copied to a different array. Thus, the distribution of the copied data and/or parity information from the degraded array may be somewhat controlled. However, depending on the amount of available space in the other arrays, the number of other arrays which have available space, etc., the data and/or parity information in the degraded array may be copied to any number of other arrays. Moreover, portions of the data and/or parity information from a given data storage drive in the degraded array may be mirrored (e.g., copied) to two or more different data storage drives and/or data storage arrays altogether. In other words, the data and/or parity information in the degraded array may not be grouped together in data storage in a same manner as in the data storage drives in the degraded array.

Additional information may be used to assist in determining the one or more data storage drives in the one or more arrays having a combined amount of available space to mirror the degraded first array. According to an illustrative approach, which is in no way intended to limit the invention, a record associated with the arrays of data storage drives in a given storage system may be maintained. Thus, the record may correspond to multiple respective data storage drives, and preferably includes information relevant to determining where to mirror the data and/or parity information of the failed data storage drive. However, in other approaches a record may be associated with and maintained for each respective array, each respective data storage drive, etc., depending on the desired approach.

In some approaches the record may include an amount of available (e.g., unused) storage space in each of the data storage drives and/or arrays of data storage drives associated therewith. Thus, the record may be consulted in order to determining whether a location is available to mirror at least a portion of the data and/or parity information of the degraded array. It is also preferred that the one or more data storage arrays determined to be used to mirror the data and/or parity information are perfectly healthy (e.g., do not include any currently failed data storage drives). Thus, in some approaches, the record may alternatively or additionally include an overall health metric of each of the plurality of arrays of data storage drives and/or of each of the data storage drives included in each of the plurality of arrays of data storage drives, e.g., which may be in a same enclosure. An overall health metric may be based on any number of desired factors, e.g., such as age of the respective drive or array, a rate at which data stored therein is updated, an amount of throughput experienced by the respective drive or array, etc. Moreover, the throughput experienced by each of the arrays may be taken into consideration when determining whether the array should be used to mirror at least a portion of the data and/or parity information of the degraded array. It is undesirable to overload the processor associated with a given data storage array in order to perform at least a portion of the mirroring thereon. Thus, a user may consider the amount of added throughput the mirroring process would add to the arrays existing performance in comparison to the amount of available space needed to mirror the degraded array to determine whether that array should be used in the mirroring process.

The proximity of the degraded array to the other storage arrays determined to perform the mirroring process may also be taken into consideration. In preferred approaches, the mirroring process is performed between arrays that are in a same storage system (e.g., storage environment) and which are directly connected together using low latency connections (e.g., a wired Ethernet cable), while data storage arrays connected using links that introduce high latency (e.g., a global area network) are preferably not used to perform the mirroring process. For instance, referring momentarily back to FIG. 4, if one of the storage drives 404 in an array 402 of the system backup 408 fail, it may be preferred that other arrays 402 in the system backup 408 and/or the lone array 414 are used to perform the mirroring process. However, arrays 402 in storage database 406 may not be used to perform the mirroring process in view of a higher latency associated with the network connection extending between the system backup 408 and the storage database 406. Although lower latency connections between arrays is desirable when performing the mirroring process, in some instances one or more arrays connected to the degraded array by a higher latency connection (relative to the lower latency connections) may be relied upon in view of a lack of available data storage arrays having available data storage space.

Returning to decision 506, method 500 may also jump to operation 510 in response to determining that a location is not available to rebuild the failed data storage drive. While it is desirable that reconstruction of the failed drive is initiated as soon as possible to avoid detrimental effects to system performance, in some approaches, reconstructing the failed drive may be deferred until a new drive can be inserted into the degraded array. For instance, a location to rebuild the failed data storage drive may not be available. As a result, method 500 may forego performing the rebuild operation and rather determine one or more data storage drives in one or more other arrays having a combined amount of available space that is sufficient to mirror data and/or parity information of the degraded first array. By mirroring the data and/or parity information of the degraded first array into one or more other arrays, the data and/or parity information may effectively be protected until the degraded array can be repaired.

Accordingly, operation 512 further includes mirroring the data and/or parity information of the degraded first array. It should be noted that in the event that operation 508 has been performed (e.g., a location is available to rebuild the failed data storage drive), the mirroring is preferably performed simultaneously and in parallel with performing the rebuild operation. As previously mentioned, the degraded array is in a vulnerable state until the rebuild operation has been completed. Thus, by mirroring the data and/or parity information of the degraded first array across multiple data storage drives in other arrays, this mirroring process may be completed much more quickly than the rebuild operation. As a result, by first initiating the rebuild operation followed by mirroring the data and/or parity information of the first array simultaneously and in parallel with performing the rebuild operation, the approaches described herein are able to achieve an efficient repair of the degraded array while also providing redundancy in the event that additional drives fail in the same degraded array.

It should be noted that in some approaches, prior to mirroring the data and/or parity information to the determined one or more data storage drives in the one or more other arrays, it may be desirable to resize the available space in the one or more data storage drives. By resizing the available space in the one or more data storage drives, conflicts with any host requests corresponding to the respective arrays may desirably be avoided, e.g., as would be appreciated by one skilled in the art after reading the present description.

In some approaches, at least some of the data storage drives may have a data storage limit associated therewith. In other words, at least some of the data storage drives may have a limit on how much data and/or parity information may be stored therein. According to an example, which is in no way intended to limit the invention, a given data storage drive may only be able to use 90% of its overall storage capacity to store data and/or parity information acquired during normal operation, while the remaining 10% of the drive's storage capacity is reserved for use during a mirroring process, e.g., as seen in operations 510 and 512. Thus, the data storage limit may effectively define a minimum amount of available space in the respective array at any given point in time, e.g., other than when data and/or parity information has been copied to the reserved available space as a part of an ongoing implementation of operations 510 and 512. Depending on the approach, the storage limit may be predefined, implemented (e.g., set) by a user, updated in real-time (e.g., based on system performance), etc., and may be implemented in any number of ways depending on the desired approach.

Moreover, existing I/O operations per second (or equivalently some other time period such as minute, etc.) are preferably utilized while mirroring the data and/or parity information. For example, as data and/or parity information is read from the drives in the degraded array during the rebuild operation, it may also be copied to the other arrays as a part of the mirroring process. In another example, host read operations received at the degraded array may be utilized to perform the mirroring process as well. Accordingly, in some approaches, determining the one or more data storage drives in the one or more arrays having a combined amount of available space to mirror the degraded first array is based on a current I/O operations-per-second value associated with each of the respective one or more data storage arrays and/or an associated amount of available throughput. It should also be noted that in some approaches the maintained record(s) may be used to determine a location to rebuild the failed data storage drive.

Because the process of mirroring the data and/or parity information from the degraded array is preferably spread across multiple different arrays as well as performed simultaneously and in parallel with the rebuild operation, the mirroring process will likely complete prior to the completion of the rebuild operation. Thus, there may be a given amount of "overlap time" during which the degraded array has been mirrored successfully to one or more other arrays prior to the completion of the rebuild operation. During this overlap time, additional data may be received by the degraded array, e.g., from users issuing write requests to the degraded array. As previously mentioned, although the degraded array has a failed drive, it may still be operational. Therefore, in some approaches, the degraded array may receive (e.g., accept) new data during the overlap time and write it to a healthy drive in the degraded array. In such approaches, it is preferred that the new data written in the degraded array is also mirrored (e.g., copied, propagated, etc.) to another array even though the mirroring process may have already been successfully completed prior to receiving the new data. The new data may be mirrored to one or more of the same arrays used in the previously completed mirroring process and/or one or more different arrays depending on the desired approach. Moreover, the new data may be mirrored from the degraded array in a same and/or similar manner as any of the approaches described above in relation to performing operation 512, e.g., as would be appreciated by one skilled in the art after reading the present description.

Referring still to FIG. 5, Decision 514 includes determining whether any additional data storage drives in the degraded array fail prior to the successful completion of the rebuild operation. In other words, decision 514 may include monitoring the status of the remaining data storage drives in the degraded array until the rebuild operation has been successfully completed. In response to determining that at least one other data storage drive in the degraded array has also failed, method 500 progresses to operation 516. There, operation 516 includes terminating the rebuild operation being performed. Moreover, operation 518 includes using the mirrored data and/or parity information from the one or more storage locations in the one or more arrays to perform a remainder of the rebuild operation.

Returning to decision 514, in response to determining that no additional data storage drives in the degraded array fail prior to the successful completion of the rebuild operation, method 500 proceeds to operation 520. There, operation 520 includes deleting the mirrored data and/or parity information of the degraded first array from the one or more data storage drives in the one or more arrays. In other words, the data and/or parity information mirrored in operation 512 may be deleted in response to the rebuild operation being completed. Once the rebuild operation is completed, the previously degraded array is fully operational and may thereby be returned to normal operation. Thus, the mirrored data and/or parity information is no longer needed at this point in time and may thereby be deleted to make room for other data and/or parity information to be stored. In some approaches the data and/or parity information may not actually be deleted, but rather designated as being deleted, e.g., for deletion in a subsequent garbage collection process.

Furthermore, operation 522 includes reallocating the space in the one or more data storage drives in the one or more arrays used to mirror the data and/or parity information of the previously degraded first array as available space. Thus, the reallocated space may be used to mirror data and/or parity information in subsequent iterations of various processes included in method 500.

It follows that various ones of the processes included in method 500 are able to achieve significant improvements in the management of data storage arrays implementing RAID technology.

Looking now to FIGS. 6A-6D, various ones of the processes included in method 500 above are presented according to an illustrative in-use example which is in no way intended to limit the invention. As an option, the present in-use example may be implemented in conjunction with features from any other embodiment listed herein, such as those described with reference to the other FIGS., such as FIGS. 4-5. However, such in-use example and others presented herein may be used in various applications and/or in permutations which may or may not be specifically described in the illustrative embodiments listed herein. Further, the in-use example presented herein may be used in any desired environment. Thus FIGS. 6A-6D (and the other FIGS.) may be deemed to include any possible permutation.

Figure 6A:
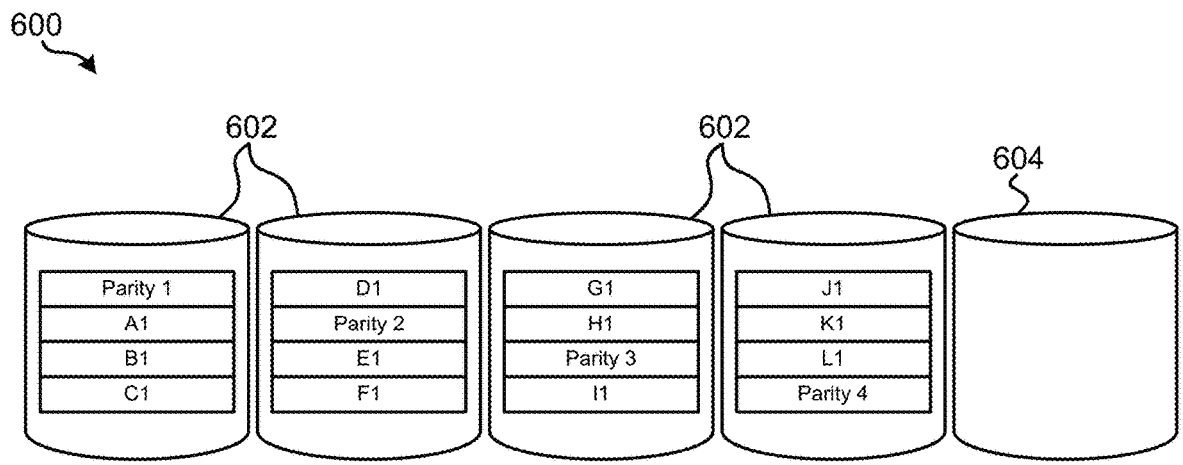
FIG. 6A-6D are representative views of a data storage array in accordance with one in-use embodiment.

Looking now to FIG. 6A, an exemplary data storage array 600 is illustrated. As shown, the array 600 includes a plurality of different data storage drives 602 having portions of data A1-L1. Moreover, parity information Parity 1, Parity 2, Parity 3, Parity 4 is stored in the data storage drives 602 according to a RAID 5 format as would be appreciated by one skilled in the art after reading the present description. Data storage array 600 further includes a spare data storage drive 604 that is not used to store any data during normal operation of the array 600. However, upon experiencing a failure of at least one of the drives 602 in the array 600, the spare storage drive 604 may be used to repair the failed drive(s), e.g., as will soon become apparent.

Figure 6B:
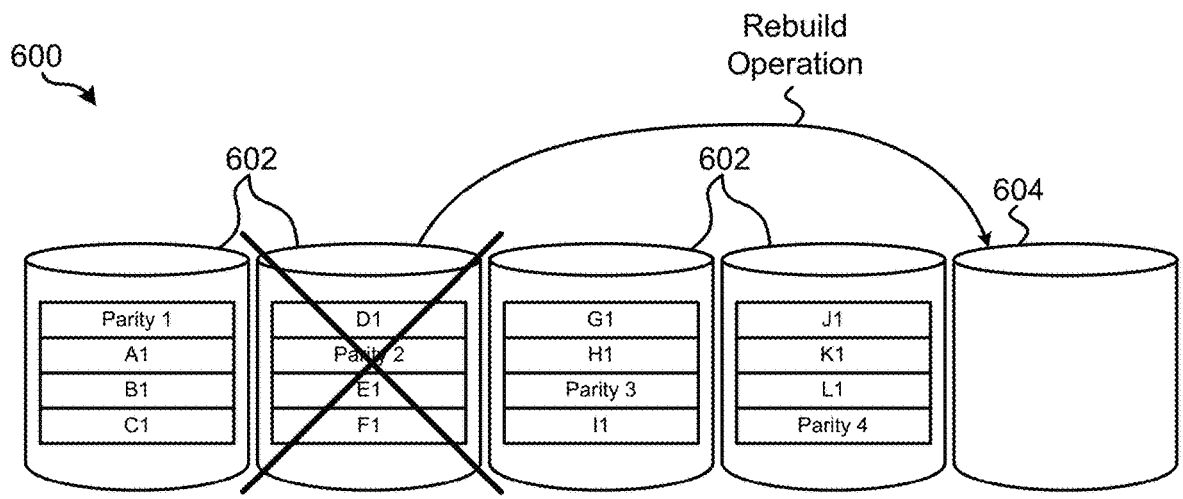
Figure 6B:
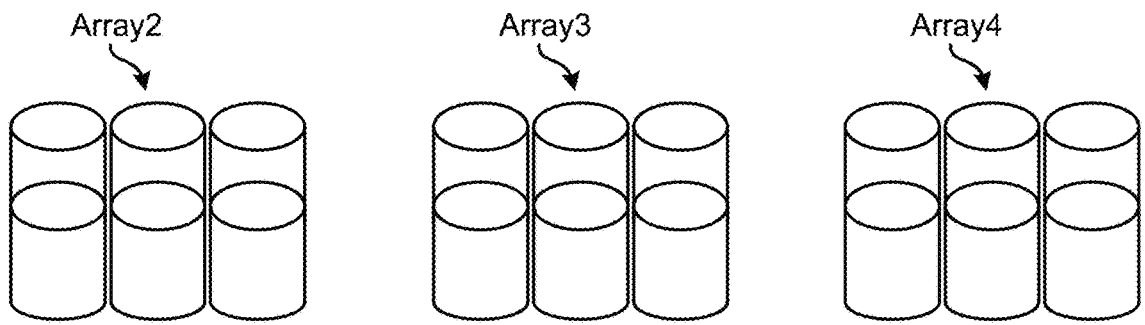

Referring now to FIG. 6B, one of the data storage drives 602 has failed (represented by the large "X" through the corresponding drive), thereby exposing the array 600, and/or the data storage system which the array 600 is a part of, to data loss. Thus, upon determining that the data storage drives 602 has failed, the spare drive 604 is designated as the location to perform a rebuild operation of the failed storage drive, and the rebuild operation is initiated.

While the rebuild operation is being performed, other arrays Array2, Array3, Array4 having available (unused) data storage space included therein are identified. As described above, the other arrays identified preferably have a combined amount of available data storage space to mirror (e.g., copy) all of the desired data and/or parity information from array 600 while the rebuild operation is ongoing.

Figure 6C:
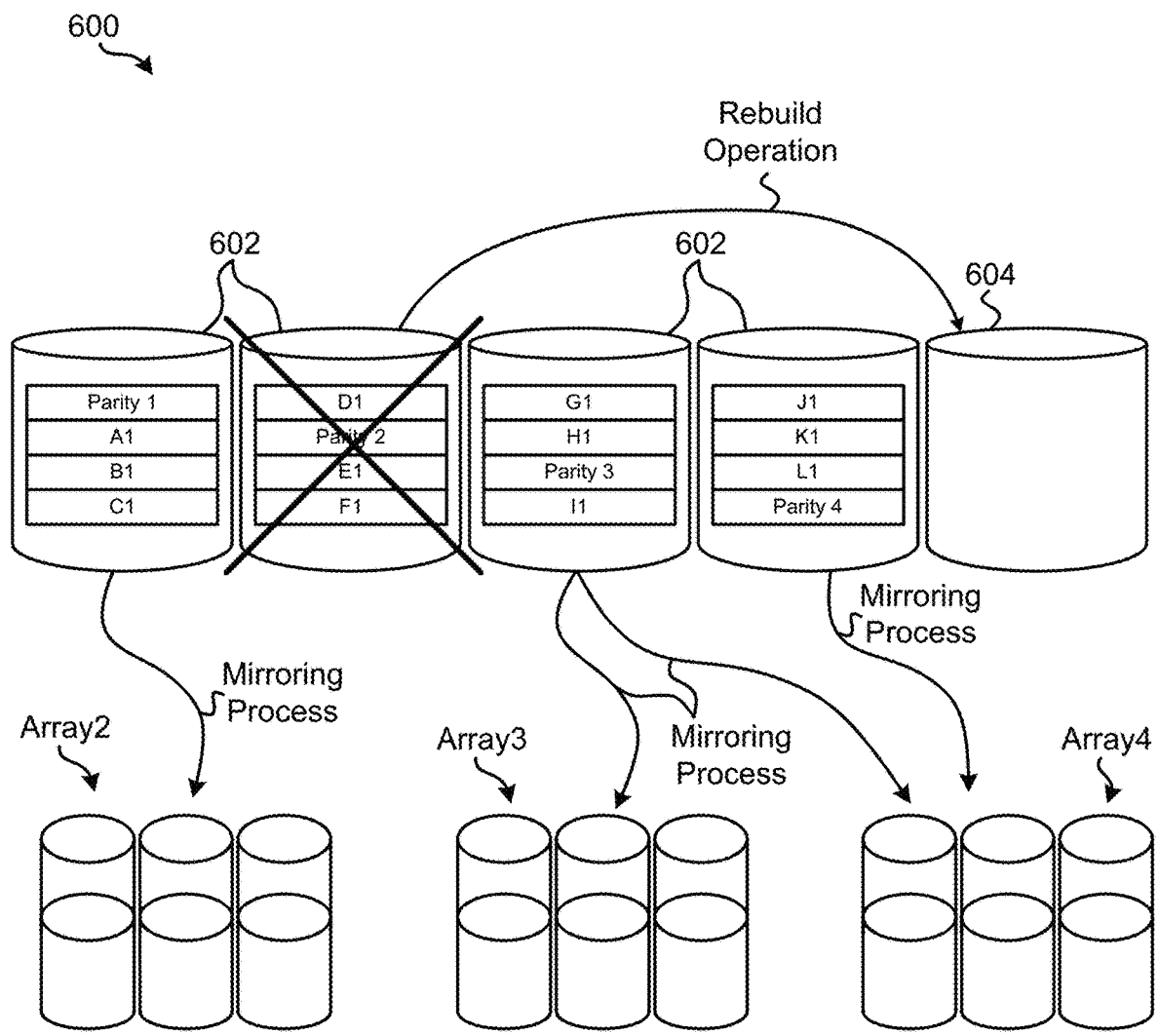

Moving to FIG. 6C, once a number of other arrays Array2, Array3, Array4 having an amount of available data storage space included therein to mirror the desired data and/or parity information from array 600 have been identified, the data and/or parity information is copied from the drives 602 in array 600 to the other arrays Array2, Array3, Array4. The data and/or parity information is preferably copied to the other arrays Array2, Array3, Array4 on the fly. In other words, the data and/or parity information is preferably copied to the other arrays Array2, Array3, Array4 simultaneously and in parallel with the rebuild operation also being performed.

Moreover, the data and/or parity information is preferably copied to a plurality of other arrays Array2, Array3, Array4 such that throughput associated with performing the mirroring is spread across a plurality of different data storage arrays and their respective processing components. As a result, the mirroring process may be completed in a much shorter amount of time than the rebuild operation, thereby reducing the amount of time that the array is exposed to further damage and increasing the efficiency of the overall process.

Figure 6D:
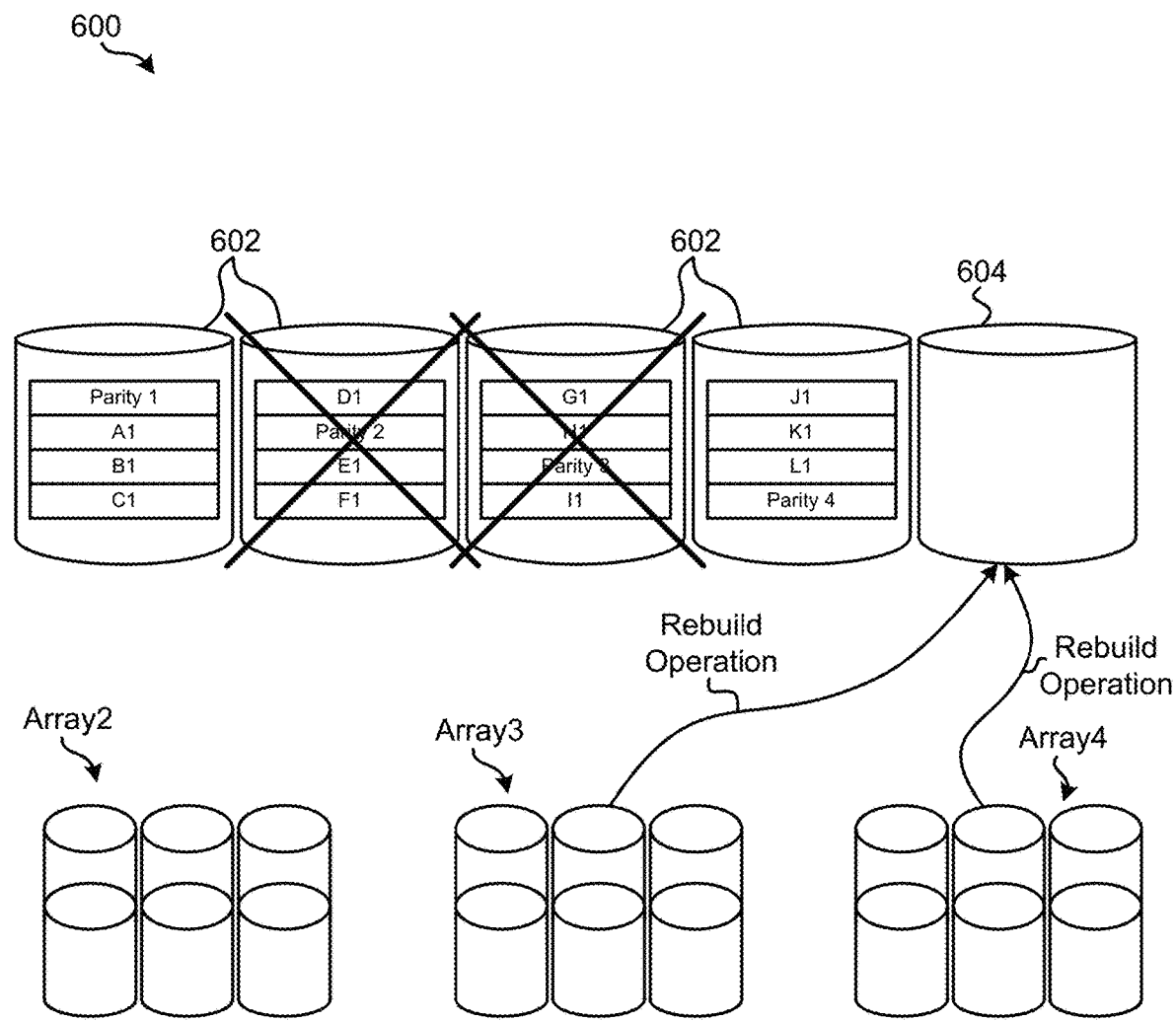

Looking now to FIG. 6D, a second data storage drive 602 has failed (represented by the large "X" in the corresponding drive) in the already exposed array 600 before the rebuild operation is completed, but after the mirroring process has completed. Accordingly, the rebuild operation being performed in the degraded array is preferably terminated. Furthermore, the data and/or parity information mirrored to the other arrays Array2, Array3, Array4 may be used to complete the existing repair operation and/or perform a rebuild operation for the second failed data storage drive. Accordingly, because data and/or information corresponding to the second failed data storage drive was mirrored to both Array3 and Array4 (see Mirroring Process of FIG. 6C above), Array3 and Array4 are used to conduct a new rebuild operation which may desirably complete the rebuild of the failed data storage drive. However, in some approaches the rebuild operation for the second failed data storage drive may be delayed until another location (drive) is found in which the rebuild operation may be performed.

It should be noted that although two drives 602 in array 600 have failed in the present in-use example, the array 600 may otherwise remain operational. A data storage array having a RAID 5 format may experience 2 drive failures before the array as a whole becomes unusable, e.g., as would be appreciated by one skilled in the art after reading the present description. Thus, a given array may desirably remain operational during the rebuild operation, e.g., when possible. However, when an array experiences too many failed drives to remain operational, the array as a whole may enter a failed state, a system administrator may be sent a warning, recovery procedures may be initiated, etc., depending on the desired embodiment.

Moreover, once the rebuild operation(s) are completed, the mirrored data and/or parity information from the formerly degraded array 600 may be deleted from the respective other arrays Array2, Array3, Array4 and the data storage space used to store the mirrored data and/or parity information in the other arrays Array2, Array3, Array4 may be reallocated as available space.

It follows that various embodiments and/or approaches described herein are able to achieve significant improvements in the management of data storage arrays implementing RAID technology after experiencing a drive failure. These improvements are particularly apparent in view of the shortcomings experienced in conventional products. While conventional products fail to provide any safeguards against the risk of experiencing a system crash and/or data loss following a storage failure, various ones of the embodiments described herein are able to reduce disk degradation, data loss, system downtime, etc. Moreover, some of the embodiments described herein are able to significantly reduce the bottleneck of the rebuild operation performance times by utilizing available (free) space in other arrays present elsewhere in the same storage system (e.g., storage environment) to be simultaneously utilized for array and parity storage in the event of a storage drive failure, thereby desirably backing up important parity stripes to healthy unaffected RAID arrays.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
determining that a data storage drive in a first array has failed;
determining a location to rebuild the failed data storage drive;

instructing performance of a rebuild operation at the determined location;
determining one or more data storage drives in one or more arrays having a combined amount of available space that is sufficient to mirror data and/or parity information of the first array;
instructing mirroring of the data and/or parity information of the first array in parallel with performing the rebuild operation;
instructing deletion of the mirrored data and/or parity information of the first array from the one or more data storage drives in the one or more arrays in response to the rebuild operation being completed; and
instructing reallocation of the space in the one or more data storage drives in the one or more arrays used to mirror the data and/or parity information of the first array as available space.

2. The computer-implemented method of claim 1, comprising:
in response to detecting a second data storage drive failure in the first array prior to the rebuild operation being completed:
instructing usage of the mirrored data and/or parity information from the one or more data storage drives in the one or more arrays to perform a remainder of the rebuild operation.

3. The computer-implemented method of claim 1, wherein the location determined to perform the rebuild of the failed data storage drive is a data storage drive allocated as a spare data storage drive in the first array.

4. The computer-implemented method of claim 1, comprising:
maintaining a record,
wherein the record includes an amount of available space in each of a plurality of arrays of data storage drives,
wherein determining the one or more data storage drives in the one or more arrays having a combined amount of available space to mirror the first array is based on the maintained record.

5. The computer-implemented method of claim 4, wherein the record includes a health metric of each of the plurality of arrays of data storage drives and/or each of the data storage drives included in each of the plurality of arrays of data storage drives.

6. The computer-implemented method of claim 1, wherein determining the one or more data storage drives in the one or more arrays having a combined amount of available space to mirror the first array is based on a current input/output operations-per-second value associated with each of the respective one or more arrays.

7. The computer-implemented method of claim 1, comprising:
instructing resizing of the available space in the determined one or more data storage drives in the one or more arrays prior to mirroring the data and/or parity information of the first array.

8. The computer-implemented method of claim 1, wherein at least one of the one or more arrays has a data storage limit associated therewith, wherein the data storage limit defines a minimum amount of available space in the respective array.

9. A computer program product comprising a computer readable storage medium having program instructions embodied therewith, wherein the computer readable storage medium is not a transitory signal per se, the program instructions readable by a processor, executable by the processor, or readable and executable by the processor to cause the processor to perform a method comprising:
determining, by the processor, that a data storage drive in a first array has failed;
determining, by the processor, a location to rebuild the failed data storage drive;
instructing, by the processor, performance of a rebuild operation at the determined location;
determining, by the processor, one or more data storage drives in one or more arrays having a combined amount of available space that is sufficient to mirror data and/or parity information of the first array;
instructing, by the processor, mirroring of the data and/or parity information of the first array in parallel with performing the rebuild operation;
instructing, by the processor, deletion of the mirrored data and/or parity information of the first array from the one or more data storage drives in the one or more arrays in response to the rebuild operation being completed; and
instructing, by the processor, reallocation of the space in the one or more data storage drives in the one or more arrays used to mirror the data and/or parity information of the first array as available space.

10. The computer program product of claim 9, the program instructions readable by the processor, executable by the processor, or readable and executable by the processor to cause the processor to perform the method comprising:
in response to detecting a second data storage drive failure in the first array prior to the rebuild operation being completed:
instructing, by the processor, usage of the mirrored data and/or parity information from the one or more data storage drives in the one or more arrays to perform a remainder of the rebuild operation.

11. The computer program product of claim 9, wherein the location determined to perform the rebuild of the failed data storage drive is a data storage drive allocated as a spare data storage drive in the first array.

12. The computer program product of claim 9, the program instructions readable by the processor, executable by the processor, or readable and executable by the processor to cause the processor to perform the method comprising:
maintaining, by the processor, a record,
wherein the record includes an amount of available space in each of a plurality of arrays of data storage drives,
wherein determining the one or more data storage drives in the one or more arrays having a combined amount of available space to mirror the first array is based on the maintained record.

13. The computer program product of claim 12, wherein the record includes a health metric of each of the plurality of arrays of data storage drives and/or each of the data storage drives included in each of the plurality of arrays of data storage drives.

14. The computer program product of claim 9, wherein determining the one or more data storage drives in the one or more arrays having a combined amount of available space to mirror the first array is based on a current input/output operations-per-second value associated with each of the respective one or more arrays.

15. The computer program product of claim 9, the program instructions readable by the processor, executable by the processor, or readable and executable by the processor to cause the processor to perform the method comprising:
instructing, by the processor, resizing of the available space in the determined one or more data storage drives in the one or more arrays prior to mirroring the data and/or parity information of the first array.

16. The computer program product of claim 9, wherein at least one of the one or more arrays has a data storage limit associated therewith, wherein the data storage limit defines a minimum amount of available space in the respective array.

17. A system, comprising:
a hardware processor; and
logic integrated with the hardware processor, executable by the hardware processor, or integrated with and executable by the hardware processor, the logic being configured to:
determine, by the hardware processor, that a data storage drive in a first array has failed;
determine, by the hardware processor, a location to rebuild the failed data storage drive;
instruct, by the hardware processor, performance of a rebuild operation at the determined location;
determine, by the hardware processor, one or more data storage drives in one or more arrays having a combined amount of available space that is sufficient to mirror data and/or parity information of the first array;
instruct, by the hardware processor, mirroring of the data and/or parity information of the first array in parallel with performing the rebuild operation;
instruct, by the hardware processor, deletion of the mirrored data and/or parity information of the first array from the one or more data storage drives in the one or more arrays in response to the rebuild operation being completed; and
instruct, by the hardware processor, reallocation of the space in the one or more data storage drives in the one or more arrays used to mirror the data and/or parity information of the first array as available space.

18. The system of claim 17, the logic being configured to:
in response to detecting a second data storage drive failure in the first array prior to the rebuild operation being completed:
instruct, by the hardware processor, usage of the mirrored data and/or parity information from the one or more data storage drives in the one or more arrays to perform a remainder of the rebuild operation.

19. The system of claim 17, wherein the location determined to perform the rebuild of the failed data storage drive is a data storage drive allocated as a spare data storage drive in the first array.

20. The system of claim 17, the logic being configured to:
maintain, by the hardware processor, a record,
wherein the record includes an amount of available space in each of a plurality of arrays of data storage drives,
wherein determining the one or more data storage drives in the one or more arrays having a combined amount of available space to mirror the first array is based on the maintained record,
wherein the record includes a health metric of each of the plurality of arrays of data storage drives and/or each of the data storage drives included in each of the plurality of arrays of data storage drives.

* * * * *